United States Patent
Li et al.

(10) Patent No.: US 10,293,890 B2
(45) Date of Patent: May 21, 2019

(54) FLARE-TYPE TENSILE LEGS FLOATING WIND TURBINE BASE, OFFSHORE WIND TURBINE AND CONSTRUCTION METHOD

(71) Applicant: XINJIANG GOLDWIND SCIENCE & TECHNOLOGY CO., LTD., Urumqi, Xinjiang (CN)

(72) Inventors: Rongfu Li, Xinjiang (CN); Jianhai Zhang, Xinjiang (CN); Haifei Zhu, Xinjiang (CN)

(73) Assignee: XINJIANG GOLDWIND SCIENCE & TECHNOLOGY CO., LTD., Urumqi, Xinjiang (CN)

( * ) Notice: Subject to any disclaimer, the term of this patent is extended or adjusted under 35 U.S.C. 154(b) by 567 days.

(21) Appl. No.: 14/911,887

(22) PCT Filed: Feb. 12, 2015

(86) PCT No.: PCT/CN2015/072953
§ 371 (c)(1),
(2) Date: Feb. 12, 2016

(87) PCT Pub. No.: WO2015/131756
PCT Pub. Date: Sep. 11, 2015

(65) Prior Publication Data
US 2016/0195070 A1    Jul. 7, 2016

(30) Foreign Application Priority Data

Mar. 4, 2014 (CN) .......................... 2014 1 0077288

(51) Int. Cl.
*F03D 13/25*    (2016.01)
*B63B 21/50*    (2006.01)
(Continued)

(52) U.S. Cl.
CPC ............ *B63B 21/502* (2013.01); *B63B 1/107* (2013.01); *F03D 13/25* (2016.05);
(Continued)

(58) Field of Classification Search
CPC ...... Y02E 10/727; Y02P 70/523; F03D 13/25; F03D 13/20; F03D 13/22; F05B 2240/93;
(Continued)

(56) References Cited

U.S. PATENT DOCUMENTS 4,457,250 A * 7/1984 Oshima .................. B63B 35/08
114/265
4,481,899 A * 11/1984 Einstabland ............ B63B 35/50
114/258
(Continued)

FOREIGN PATENT DOCUMENTS

CN    101649803 A    2/2010
CN    201582043 U    9/2010
(Continued)

OTHER PUBLICATIONS

First Australian Office Action dated Oct. 17, 2016; Appln. No. 2015226662.
(Continued)

*Primary Examiner* — Jason D Shanske
*Assistant Examiner* — Joshua R Beebe
(74) *Attorney, Agent, or Firm* — Ladas & Parry LLP; Loren K. Thompson (57) ABSTRACT

A flare-type tension leg floating wind turbine foundation is provided, which includes a top support platform configured to support a tower frame, a blade and a wind turbine generator set; a bottom support structure connected to a plurality of tension legs; at least three hollow upright columns connected between the top support platform and the bottom support structure and arranged around a vertical
(Continued)

center line of the floating wind turbine foundation, each of the at least three upright columns being inclined outward from a lower end to an upper end with respect to the vertical center line of the floating wind turbine foundation; and a ballast adjusting system provided in the upright columns and/or the bottom support structure.

19 Claims, 2 Drawing Sheets

(51) Int. Cl.
*B63B 1/10* (2006.01)
*B63B 1/12* (2006.01)
*B63B 35/44* (2006.01)
*B63B 39/06* (2006.01)

(52) U.S. Cl.
CPC ... *B63B 2001/128* (2013.01); *B63B 2035/446* (2013.01); *B63B 2039/067* (2013.01); *F05B 2240/93* (2013.01); *F05B 2240/95* (2013.01); *Y02E 10/727* (2013.01); *Y02P 70/523* (2015.11)

(58) Field of Classification Search
CPC ... F05B 2240/95; B63B 1/107; B63B 21/502; B63B 2001/128; B63B 2035/446; B63B 2039/067
See application file for complete search history.

(56) References Cited

U.S. PATENT DOCUMENTS

| | | | |
|---|---|---|---|
| 5,441,008 A * | 8/1995 | Lange | B63B 21/10 114/179 |
| 5,704,731 A * | 1/1998 | Huang | B63B 3/04 114/264 |
| 6,869,251 B2 * | 3/2005 | Zou | B63B 1/048 114/256 |
| 7,075,189 B2 * | 7/2006 | Heronemus | B63B 1/047 290/44 |
| 2009/0072544 A1 * | 3/2009 | Pao | B63B 21/50 290/55 |
| 2010/0074693 A1 | 3/2010 | Leverette et al. | |
| 2011/0107951 A1 | 5/2011 | Vandenworm | |
| 2011/0135400 A1 * | 6/2011 | Hall | E02D 27/42 405/228 |
| 2012/0000071 A1 | 1/2012 | Harris | |
| 2012/0082514 A1 | 4/2012 | Horton, III et al. | |
| 2012/0213592 A1 * | 8/2012 | Nowlin | E02D 27/42 405/224 |
| 2012/0280505 A1 * | 11/2012 | Thomas | F03B 13/186 290/53 |
| 2012/0318186 A1 * | 12/2012 | Thieffry | B63B 9/065 114/264 |
| 2013/0000541 A1 | 1/2013 | Rijken et al. | |
| 2013/0233231 A1 | 9/2013 | Dagher et al. | |

FOREIGN PATENT DOCUMENTS

| | | |
|---|---|---|
| CN | 101965454 A | 2/2011 |
| CN | 102146873 A | 8/2011 |
| CN | 202295230 U | 7/2012 |
| CN | 202295236 U | 7/2012 |
| CN | 202483813 U | 10/2012 |
| CN | 102765466 A | 11/2012 |
| CN | 203035449 U | 7/2013 |
| CN | 203158199 U | 8/2013 |
| CN | 103277262 A | 9/2013 |
| CN | 103291546 A | 9/2013 |
| CN | 103423093 A | 12/2013 |
| CN | 103818523 A | 5/2014 |
| CN | 203767042 U | 8/2014 |
| EP | 2479101 A1 | 7/2012 |
| GB | 2182375 A | 5/1987 |
| JP | 2010-115978 A | 5/2010 |
| WO | 2009064737 A1 | 5/2009 |

OTHER PUBLICATIONS

International Search Report Appln. No. PCT/CN2015/072953; dated Apr. 28, 2015.
First Chinese Office Action dated Oct. 10, 2015; Appln. No. 201410077288.2 (Summary of the 1st Office Action in English—1 page).
Extended European Search Report dated Nov. 14, 2017; Appln. 15758548.0.

* cited by examiner

FLARE-TYPE TENSILE LEGS FLOATING WIND TURBINE BASE, OFFSHORE WIND TURBINE AND CONSTRUCTION METHOD

This application is the national phase of International Application No. PCT/CN2015/072953, titled "FLARE-TYPE TENSILE LEGS FLOATING WIND TURBINE BASE, OFFSHORE WIND TURBINE AND CONSTRUCTION METHOD", filed on Feb. 12, 2015, which claims the benefit of priority to Chinese patent application No. 201410077288.2 titled "FLARE-TYPE TENSILE LEGS FLOATING WIND TURBINE FOUNDATION, OFFSHORE WIND TURBINE AND CONSTRUCTION METHOD" and filed with the Chinese State Intellectual Property Office on Mar. 4, 2014, entire disclosures of both applications are incorporated herein by reference.

FIELD

The present application relates to the field of an offshore wind turbine, and in particular to a flare-type tension leg floating wind turbine foundation, an offshore wind turbine including the floating wind turbine foundation and a method for installing and constructing the offshore wind turbine.

BACKGROUND

In deep sea areas with a depth greater than 50 meters, developable wind resources are more and have higher quality, and the market prospect is broader. To develop the deep sea wind farm at these sea areas, the method of fixing various through piles at the sea bed, which is generally adopted in the offshore wind farms, has no advantage, the reason is that, as the water depth increases, the cost of a stationary platform rises perpendicularly, and the costs of construction and maintenance of the stationary offshore wind turbine are higher than those of the floating offshore wind turbine. Hence, in order to facilitate constructing the offshore wind farm in the deep sea areas, an economical and practical floating wind turbine is required to be developed. A key subject in developing a floating wind turbine is to develop a floating wind turbine foundation having a good movement performance, a compact structure and economic practicality.

The load applied on the floating wind turbine foundation used in the offshore wind power field is different from that the load applied on a mobile platform in the conventional offshore oil engineering. In addition to the combined effect from wind, waves and currents, the floating offshore wind turbine foundation also is subjected to a gyroscopic effect caused by the high-rise structure of the wind turbine, overturning moments Mx, My and a torque Mz around the vertical axis; the whole wind turbine will generate a violent movement in six degrees of freedom including axial movements along X, Y and Z axes and swings around the X, Y and Z axes, which causes a great challenge for the pitch control and yaw control system of the wind turbine, and may affect the normal operation of the wind turbine, affect the energy output, and even endanger the safety of the whole system structure.

Presently, according to the need for developing the deep sea wind farms, the deep sea floating oil platform commonly used in the sea oil industry has been employed in the wind power field, and various forms of floating wind turbines are developed, including a single pole platform (SPAR) form, a semi-submersible platform form, a tension leg platform (TLP) form and other complex forms. So far, about three floating wind turbine projects have been constructed worldwide, which are Hywind, Blue H and Windfloat. Hywind project is successfully developed by the Statoil Hydro, the Technip and the Siemens jointly and is constructed at the North Sea close to Norway in 2009. The basic concept in Hywind project is SPAR, the floating structure is an elongated steel pipe with a length of about 117 meters, and the steel pipe has one end connected to a foundation and another end connected to a wind turbine flange. Steel pipes filled by a ballast tank are transmitted to an installation site and stand on the sea surface, and the whole floating body is connected to the sea bed via three mooring anchor cables. In 2007, the Blue H Company of Holland installs a double-blade wind turbine prototype at the costal area of Italy, which uses the tension leg platform design; and the buoyancy of the platform is arranged to be greater than its gravity, the tension legs are always in a tensioned state to maintain the stability of the platform. At the end of 2011, the Principle Power, the Vestas and the EDP cooperate to complete the Windfloat project at the west coast of Portugal, the floating foundation is semi-submersible and the main body of the floating foundation is consisted by three floating cylinders, and the wind turbine stands on one of the floating cylinders; the dynamic ballast water can offset the wind heeling moment automatically, and the bottom of the wind turbine is fixed to the sea bed, with a depth greater than 50 meters, via four catenary cables.

However, the floating wind turbine projects described above generally have the following disadvantages, the costs of manufacturing, transporting and installing are high, the movement performance is not good, the structure is complicated and the service life is not long.

SUMMARY

An object of the present application is to provide a flare-type tension leg floating wind turbine foundation which can be installed integrally and be suitable for being towed as a whole, and an offshore wind turbine.

Another object of the present application is to provide a flare-type tension leg floating wind turbine foundation having a good movement performance, and an offshore wind turbine.

Another object of the present application is to provide a flare-type tension leg floating wind turbine foundation with a reduced manufacturing and installing cost, and an offshore wind turbine.

Another object of the present application is to provide a method for installing and constructing an offshore wind turbine which is convenient, quick and has a low cost.

In order to achieve the above objects, a flare-type tension leg floating wind turbine foundation is provided, which includes a top support platform configured to support a tower frame, a blade and a wind turbine generator set; a bottom support structure connected to a plurality of tension legs; at least three hollow upright columns connected between the top support platform and the bottom support structure and arranged around a vertical center line of the floating wind turbine foundation, each of the at least three upright columns being inclined outward from a lower end to an upper end with respect to the vertical center line of the floating wind turbine foundation; and a ballast adjusting system provided in the upright columns and/or the bottom support structure.

The bottom support structure may be formed by a polygonal pontoon having a plurality of outward protruding portions. The polygonal pontoon has a plurality of outward protruding portions, and bottoms of the upright columns are provided on the outward protruding portions respectively.

A hole may be formed in a central portion of the polygonal pontoon.

An included angle between each of the upright columns and a vertical direction ranges from 5 degrees to 15 degrees.

The bottom support structure may be formed by a truss structure.

The polygonal pontoon may be a Y-shaped pontoon having a Y-shaped planar shape.

The ballast adjusting system may be provided at the bottom of each of the upright columns.

An outward protruding fairlead is formed at an end of each of the outward protruding portions of the polygonal pontoon, and the tension legs are connected to the polygonal pontoon by the respective outward protruding fairlead. The outward protruding fairlead is connected to the tension legs via a universal joint.

The outward protruding fairlead is connected to the tension legs via a universal joint.

The outward protruding fairlead is located at an outer side of each of the upright columns, and at least two tension legs are connected to the outward protruding fairlead at the outer side of each of the upright columns.

An outward protruding horizontal length of the outward protruding fairlead is 0.5 to 1.5 times of a maximum outer diameter of the upright column.

The truss structure may have a polygonal planar shape, and fairleads are provided at outward protruding edges of the truss structure and are connected to the tension legs via universal joints.

The upright columns may be arranged symmetrically with respect to a center of the floating wind turbine foundation.

At least one of the upright columns may have a rounded rectangle cross section.

At least one of the upright columns may have a circular or elliptical cross section.

A ballast medium of the ballast adjusting system may be seawater or a combination of seawater and gravel.

The top support platform may be formed by a polygonal box-type structure, and an internal space for installing an auxiliary device may be formed inside the top support platform.

The top support platform may be formed by a Y-shaped box-type structure.

The top support platform may be formed by a truss structure.

The hole may have a polygonal cross section.

The floating wind turbine foundation may further include a tower frame support base provided on the top support platform.

The tower frame support base may include a support tube installed on the top support platform; and a plurality of support rods arranged to surround the support tube, and each of the support rods has one end connected to an upper portion of the support tube and another end connected to the top support platform, to obliquely support the support tube.

A space for installing an auxiliary device may be formed inside the support tube.

The bottom of the tower frame may be installed at the top of the support tube via a flange.

A tower frame support base may be installed at a center of the top support platform to support the bottom of the tower frame.

The tension legs may be formed by at least one of a steel cable, a polyester fiber cable, a steel pipe, a polyurethane cable and an anchor chain.

According to another aspect of the present application, an offshore wind turbine is further provided, which includes the flare-type tension leg floating wind turbine foundation described above and a tower frame, a blade and a wind turbine generator set installed on the floating wind turbine foundation.

The bottom of the tower frame may be connected to the flare-type tension leg floating wind turbine foundation via a flange.

Outward protruding fairleads are formed at outer edges of the bottom support structure to be connected to the tension legs. The outward protruding fairleads may be connected to the tension legs via universal joints.

According to another aspect of the present application, a method for installing and constructing an offshore wind turbine is further provided, which includes the following steps: assembling, at a dock of a port, the flare-type tension leg floating wind turbine foundation, a tower frame, a blade and a wind turbine generator set, to form a whole floating offshore wind turbine; wet-towing the whole floating offshore wind turbine to an offshore installation site by a towboat; and anchoring the tension legs to the sea bed.

During the process of assembling and fixing the whole floating offshore wind turbine, the ballast adjusting system may be used to maintain the whole floating offshore wind turbine in a stable state.

During the process of assembling, the tension legs may be connected to the flare-type tension leg floating wind turbine foundation.

The tension legs may be connected after the whole floating offshore wind turbine is wet-towed to an offshore installation site by a towboat.

In the present application, since the floating wind turbine foundation includes outward-inclined upright columns, the static stability and the seakeeping are good in towage, thereby overcoming the shortage that the conventional tension leg platform can not be wet-towed and installed as a whole, avoiding using an expensive large offshore installation vessel, and reducing the cost of installation and construction. Since the upright columns are inclined outward, the size of the upright columns may be decreased appropriately while still generating the same buoyancy as that of the conventional vertical upright columns, thereby reducing the steel amount and reducing the structural cost of the floating wind turbine foundation. In addition, since the outward-inclined upright columns are used, additional mass and additional damping of the whole floating wind turbine system for swaying/surging are efficiently increased, thereby overcoming the shortage that a horizontal movement range of the conventional tension leg platform is too large, and ensuring that the wind turbine is not affected by the wake flow to increase the generating capacity. In addition, additional mass and additional damping for yawing are increased efficiently, thereby reducing a movement range for yawing, ensuring that the wind turbine faces the wind, and improving the generating capacity.

In the present application, since the outward protruding fairleads are used, the arrangement sizes of the upright columns and the bottom pontoon may be reduced, thereby saving steel material, reducing the number of tension legs, and further reducing the cost. In addition, the outward protruding fairleads increase the moment arm and increase the restoring moment in rolling/pitching, thus the whole foundation has a better movement performance, and the swing angle is decreased by at least 25% as compared with the existing similar technologies.

In the present application, the upright columns and the bottom pontoon of the floating wind turbine foundation each have a rectangular cross section, thus have a simple manufacturing process, can be manufactured conveniently and is easy to implement. The floating wind turbine foundation may be constructed on the dock or the slipway without complicated aloft work; the whole floating wind turbine can be assembled by a land hoist at the dock of the shore, then is towed (wet-towed) to an installation site as a whole, and is positioned by mooring.

The flare-type tension leg floating wind turbine foundation according to the present application has a good movement performance, and has a lower cost than the conventional floating wind turbine foundation, is suitable for the sea area with a water depth greater than 30 meters, particularly suitable for the sea area with a medium water depth ranging from 30 meters to 60 meters. The flare-type tension leg floating wind turbine foundation has competitive performance and cost as compared with the conventional jacket foundation, and can carry a wind turbine above a 5MW level, and can ensure the structure strength and the fatigue life of the whole wind turbine, ensure the wind turbine to operate normally to generate electricity, and have particular advantages, for example, having a good mobility, being convenient to transport and maintain, having a good recyclability, and having a little influence to the environment in assembling and disassembling. In addition, due to the appearance characteristic of the flare-type tension leg floating wind turbine foundation and a large tension force of the tension legs according to the present application, the movement period of rolling/pitching and heaving of the whole foundation is less than 3 seconds, which avoids a period range of 3 to 20 s of the energy concentration of waves, avoids a fundamental frequency of the tower frame, and also avoids the 1P, 3P frequency range of the wind turbine, thereby efficiently reducing the resonance response of the whole floating wind turbine system, reducing the limit load level and the fatigue load level of the whole wind turbine, and ensuring the safe and reliable operation of the wind turbine.

In the present application, since the technology of combining the outward-inclined upright columns and the outward protruding fairleads is used, the rolling/pitching movement range of the whole floating wind turbine system is reduced obviously, thereby decreasing an included angle between the wind flow and the blades, and increasing the generating capacity of the wind turbine below a rated wind speed.

In the present application, since the technology of combining the outward-inclined upright columns and the outward protruding fairleads is used, the outward-inclined upright columns may provide a great rolling/pitching auxiliary recovery force similar to the semi-submersible foundation, thereby reducing a risk that the tension legs become slack, reducing the tension force of the tension legs, reducing a risk of fatigue damage of the fairleads, and overcoming the disaster which may be caused in the case that the tension legs of the conventional tension leg platform become slack and the shortage that the fairleads are apt to be fatigue and damaged due to a high stress.

In the present application, the flare-type tension leg floating foundation avoids using the conventional jacket nodes, thereby reducing the fatigue damage and ensuring the fatigue life of the whole structure.

In the present application, the tension legs connected to the flare-type tension leg floating foundation are made by a polyurethane cable or a steel cable, thereby reducing the mooring cost and construction difficulty.

In the present application, the flare-type tension leg floating wind turbine foundation is further equipped with a pressure-adjustable ballast water system, i.e., a ballast adjusting system, thus, the stability requirement in various working conditions, for example assembling close to shore, towage and an on-site working condition, can be met, and it also allows to perform an offshore construction conveniently in various working conditions.

The flare-type tension leg floating wind turbine foundation according to the present application has characteristics of having a simple structure, being convenient to manufacture, having a low cost and being easy to implement. As an important marine equipment for developing the deep sea wind farm, the flare-type tension leg floating wind turbine foundation in the present application can support a large capacity wind turbine set having a capacity above 5MW to operate safely.

With the flare-type tension leg floating wind turbine foundation according to the present application, the corresponding offshore wind turbine has an obvious advantage of being easy to install and construct. When the whole unit is assembled at the dock of the port on the bank, the ballast water in the three upright columns and the bottom pontoon is adjusted, to allow the draft of the foundation to meet the assembling requirement of the whole floating structure, and in this case the draft is shallow (not exceeding 8 meters); the ballast water is adjusted to a certain draft after the assembling is finished, the whole unit is wet-towed to an installation site, a valve in communication with the interior of the bottom pontoon may be switched on to pour into ballast water, then the tension legs are connected, and the ballast water is discharged by the ballast adjusting system until the tension legs become tense by the designed draft. Thus, the whole operation is simple and convenient, and the cost is low.

BRIEF DESCRIPTION OF THE DRAWINGS

The above and other objects and features of the present application will become apparent according to the following description in conjunction with the drawings. In which.

DETAILED DESCRIPTION OF THE EMBODIMENTS

Hereinafter, embodiments of the present application are described in detail in conjunction with the drawings.

Figure 1:
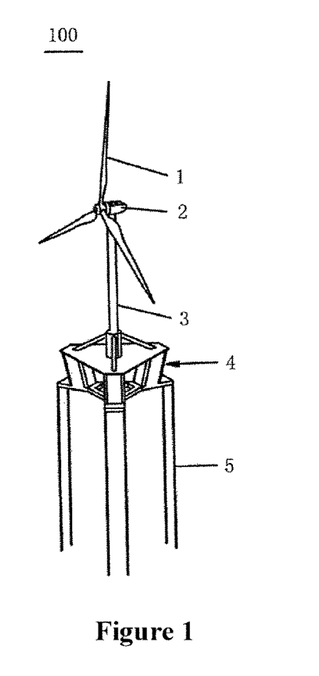
FIG. 1 is a perspective view showing an offshore wind turbine including a flare-type tension leg floating wind turbine foundation according to a first embodiment of the present application.
Figure 2:
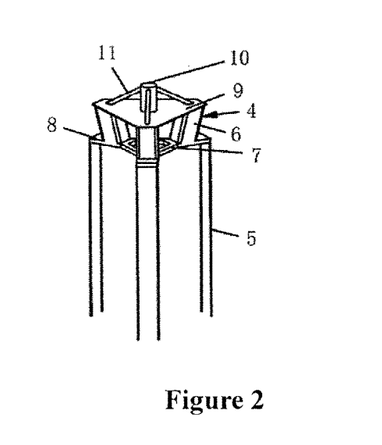
FIG. 2 is a perspective view showing the flare-type tension leg floating wind turbine foundation according to the first embodiment of the present application.
Figure 3:
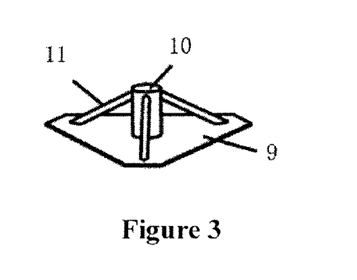
FIG. 3 is a perspective view showing a tower frame support base of the flare-type tension leg floating wind turbine foundation according to the first embodiment of the present application.
Figure 4:
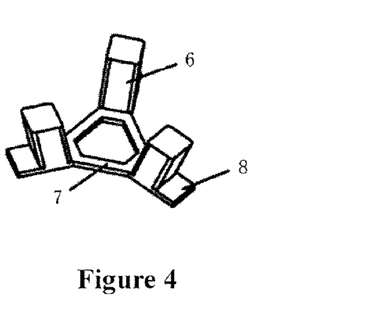
FIG. 4 is a perspective view showing upright columns and a bottom pontoon of the flare-type tension leg floating wind turbine foundation according to the first embodiment of the present application.

FIG. 1 is a perspective view showing an offshore wind turbine 100 having a flare-type tension leg floating wind turbine foundation 4 according to a first embodiment of the present application. FIG. 2 is a perspective view showing the flare-type tension leg floating wind turbine foundation 4 according to the first embodiment of the present application. FIG. 3 is a perspective view showing tower frame support bases 10 and 11 of the flare-type tension leg floating wind turbine foundation 4 according to the first embodiment of the present application. FIG. 4 is a perspective view showing upright columns 6 and a bottom pontoon 7 of the flare-type tension leg floating wind turbine foundation 4 according to the first embodiment of the present application.

As shown in FIG. 1, the offshore wind turbine 100 mainly includes the flare-type tension leg floating wind turbine foundation 4, a tower frame 3, blades 1 and a wind turbine generator set 2. The floating wind turbine foundation 4 is anchored to the sea bed (not shown) via tension legs 5. The blades 1 and the wind turbine generator set 1 are installed at the top of the tower frame 3, and the bottom of the tower frame 3 is connected to the floating wind turbine foundation 4, thus the wind turbine generator set 2 and the blades 1 can be supported by the floating wind turbine foundation 4 to operate normally, thereby generating electricity.

Hereinafter, the structural features of the flare-type tension leg floating wind turbine foundation 4 according to the first embodiment of the present application is described in detail in conjunction with FIG. 2 to FIG. 4.

As shown in FIG. 2 to FIG. 4, the flare-type tension leg floating wind turbine foundation 4 according to the first embodiment of the present application mainly includes a top support platform 9, three upright columns 6 and a bottom support structure 7. The three upright columns 6 are connected between the top support platform 9 and the bottom support structure 7. The bottom support structure 7 is connected to multiple tension legs 5.

The bottom support structure 7 may be embodied as a pontoon, and hence the bottom support structure 7 in this embodiment may also be referred to as a bottom pontoon. As shown in FIG. 4, the bottom pontoon 7 has a Y-shaped plane, and hence the pontoon is also referred to as a Y-shaped pontoon. However, the present application is not limited to this, i.e., the shape of the bottom pontoon 7 and the number of the upright columns 6 may be changed. For example, four, five or more upright columns may be provided, and accordingly, the bottom pontoon 7 may be embodied as a triangular pontoon body, a quadrilateral pontoon body, a pentagonal pontoon body or a polygonal pontoon body with more than five edges. In addition, the shape of the bottom pontoon 7 is not limited to the polygon, and may also be circular, elliptical and other shapes. However, it is preferable that a hole is formed at the central of the bottom pontoon 7, and it is preferable that the hole has a polygonal cross section, in this way, the weight of the bottom pontoon 7 is reduced, materials are saved and the bottom pontoon 7 is convenient to manufacture. The shape of the hole is not limited to polygon, and may also be circular, elliptical and other shapes. The polygonal bottom pontoon 7 is generally located at a deep position below the water surface, which reduces the wave force greatly. Since the bottom pontoon has the polygonal cross section, additional damping and additional mass of the whole floating wind turbine foundation for heaving, rolling, pitching and yawing are increased efficiently, thereby realizing an object of reducing the movement range of the whole offshore wind turbine. In case of assembling close to the shore, the bottom pontoon 7 may provide a buoyancy to support the whole floating wind turbine, thus the foundation has a shallow draft to meet the requirement of shallow shaft at a port. Below the designed draft for the wind turbine installation site, the bottom pontoon may be filled with ballast water, thereby reducing the center of gravity of the whole foundation and improving the stability and seakeeping.

The bottom pontoon 7 may be formed with multiple outward protruding portions, and the bottoms of each upright column 6 may be arranged on the respective outward protruding portion of the bottom pontoon 7. In this embodiment, it may be considered that the Y-shaped bottom pontoon 7 is formed by forming three outward protruding portions on the outer side of the hexagonal pontoon. Preferably, for the Y-shaped bottom pontoon 7, the outward protruding portions may be integrally formed with the hexagonal pontoon. An outward protruding fairlead 8 may be formed at an end of each of the outward protruding portions, to be connected to the tension leg 5. The number of the outward protruding portions may be changed, for example, the number of the outward protruding portions may be same as the number of the upright columns 6. Preferably, the outward protruding fairlead 8 is formed at the outer side of the respective upright column 6 and is connected to the tension leg 5 via a universal joint (not shown). The tension leg 5 may be formed by a steel cable and a polyester fiber cable. However, the present application is not limited to this, and the tension leg 5 may also be formed by a steel pipe, polyurethane, or an anchor chain, or a combination of the steel pipe, polyurethane, and the anchor chain. Preferably, two tension legs 5 may be provided at the outer side of each upright column 6 to connect the outward protruding fairlead 8. Alternatively, more than two tension legs 5 may also be provided to connect the outward protruding fairlead 8.

The outward protruding fairlead 8 is connected to the tension legs 5 via the universal joint, hence the tension legs 5 is rotatable in any axial direction and does not generate bending moment, in this way, an arm of force is increased and a roll/pitch restoring moment is increased, which allows the whole floating wind turbine foundation to have a better movement performance; and the arrangement sizes of the upright columns and the pontoon may be reduced appropriately, to save steel material and reduce the number of tension legs, thereby further reducing the cost.

The top support platform 9 on the top of the outward-inclined upright columns 6 can support upright columns 10 to guarantee the structural strength of the floating wind turbine foundation. In addition, devices such as guardrails and a windlass may be provided on the top support platform 9, to make it easy for the operation and maintenance staffs on the site to maintain the wind turbine by means of the top support platform 9 after the maintenance vessel is stopped by one side of the square upright column 6, and in this way, the top support platform 9 functions as a main working platform of the offshore wind turbine 100. The bottom of the top support platform 9 is supported by the upright columns 6 and connected to the upright columns 6, and the top of the top support platform 9 supports the tower frame 3, the wind turbine generator set 2 and the blades 1. In this embodiment, the top support platform 9 is a triangular platform, which matches with the shape of the Y-shaped bottom pontoon 7. The three upright columns 6 may be arranged symmetrically with respect to a center of the floating wind turbine foundation 4. However, the present application is not limited to this, and the shape of the top support platform 9 may be changed according to the number of the upright columns 6 and/or the shape of the bottom support structure 7. For example, the shape of the top support platform 9 may be rectangular, circular and other shapes. The top support platform 9 may be formed by a truss structure, a box-type structure or a steel plate with an appropriate thickness, as long as the top support platform 9 can support the tower frame 3, the wind turbine generator set 2 and the blades 1.

In this embodiment, the upright columns 6 are connected between the top support platform 9 and the bottom support structure 7, and are arranged around a vertical center line of the floating wind turbine foundation 4. Each of the upright columns 6 is inclined outwards from its lower end to its upper end with respect to the vertical center line of the floating wind turbine foundation 4. Each of the upright columns 6 is hollow, hence similar to the bottom pontoon 7, a ballast adjusting system may be provided in the upright column 6. Preferably, the ballast adjusting system is provided at the bottom of the upright column 6 to lower a center of gravity of the ballast adjusting system, thereby improving the stability of the floating wind turbine foundation 4 and the whole offshore wind turbine 100. In this case, no ballast adjusting system is provided in the bottom pontoon 7 and the ballast adjusting system is provided only at the bottom of the upright column 6.

A ballast medium for the ballast adjusting system may be freshwater, seawater or a combination of seawater and gravel. In case of the ballast medium consisting of seawater or a combination of seawater and gravel, the raw materials may be obtained locally, thus it is convenient to perfuse and the cost is low.

As shown in FIG. 2 to FIG. 4, the floating wind turbine foundation 4 mainly includes three outward-inclined square upright columns 6 with rounded corners (i.e., each upright column 6 has a rounded rectangle cross section), the bottoms of the three upright columns 6 are connected to the hexagonal bottom pontoon 7 with three outward protruding portions (also referred to as the Y-shaped pontoon) and the tops of the three upright columns 6 are connected to the triangular top support platform 9. Preferably, each of the upright column 6 is inclined outward by 5 degrees to 15 degrees with respect to the vertical center line of the floating wind turbine foundation 4. However, the present application is not limited to this, and the inclination angle of the upright column 6 with respect to the vertical center line of the floating wind turbine foundation 4 may be changed. The outward-inclined square upright columns 6 are mainly used to increase the stability and the seakeeping of the floating foundation in a freely-floating state. In addition, the greater a rolling/pitching angle is, the larger an area of a water plane is, the longer a distance between the centroid of the area and the rotation axis is, and the greater the area moment is, and hence a greater restoring force can be provided.

The manufacture of the upright columns 6 having an approximately square or rectangular cross section may facilitate simplifying the manufacturing process, and the corners of the upright columns 6 being formed as circular arcs can alleviate the impact to the upright columns 6 from the seawater, thereby extending the service life of the upright columns 6. Hence, the upright columns 6 may also have a circular or elliptical cross section. The outward protruding horizontal length of the outward protruding fairlead 8 arranged at the end of the outward protruding portion of the bottom pontoon 7 may be 0.5 to 1.5 times of the maximum outer diameter of the upright column 6. Preferably, the outward protruding horizontal length of the outward protruding fairlead 8 may be 1 to 1.5 times of the maximum edge length of the rectangular cross section of the upright column 6 or the diameter of the circular cross section of the upright column 6. However, the present application is not limited to this, and the outward protruding horizontal length of the outward protruding fairlead 8 may be changed as required.

Hereinafter a connection structure between the tower frame 3 and the top support platform 9 is described in conjunction with FIG. 2 and FIG. 3. Generally, the bottom of the tower frame 3 is connected to the flare-type tension leg floating wind turbine foundation 4 via a flange, and more specifically, the tower frame 3 may be installed on the top support platform 9 via the flange. Preferably, as shown in FIG. 1 to FIG. 3, a tower frame support base may be arranged on the top support platform 9 to support the tower frame 3.

The tower frame support base include a support tube 10, the support tube 10 is installed at the center of the top support platform 9; and multiple support rods 11 are arranged to surround the support tube 10. Each of the support rods 11 has one end connected to an upper portion of the support tube 10 and another end connected to the top support platform 9, to obliquely support the support tube 11. The diameter of the support tube 10 is great, for example the diameter may be up to 6.5 m or greater, hence a space for installing auxiliary devices may be formed inside the support tube 10, and various types of auxiliary devices, such as an electrical cabinet, can be installed in the space, thereby utilizing the internal space of the support tube 10 efficiently. In this embodiment, the number of the support rods 11 is three, but the present application is not limited to this, and the number of the support rods 11 may be four or more.

The support tube 10 is connected to the tower frame 3 via a flange at the top and a flange at the tower bottom, to support the wind turbine generator set 2 and the tower frame 3 and other devices. However, the present application is not limited to this, and the tower frame 3 may also be directly installed on the top support platform 9.

The designed draft of the whole floating wind turbine foundation having the above structure may be 10 m to 12 m, and the ballast water adjusting system provided at the bottom of each upright column 6 and/or provided inside the bottom pontoon 7 can adjust the draft for towage and the draft for an on-site working condition, hence the whole floating wind turbine foundation 4 has an obvious structure cost, a low installation, transportation and maintenance cost, a good movement performance, and the movement range is less than 2 degrees in case of an extreme sea condition which occurs once in one hundred years.

In the above embodiment, all the components are connected together by welding. The connection between the cylindrical upright column 10 at the middle and the top support platform 9 needs to be intensified reasonably based on analysis of the operation working condition of the wind turbine 100 and the structural strength of the wind turbine 100 in the extreme sea condition. The interiors of the outward-inclined square upright columns 6 and the bottom pontoon 7 are required to be intensified reasonably to bear loads from a hydrostatic pressure and a wave pressure. The structural sizes of the upright columns 6 and the bottom pontoon 7 are required to meet the requirements of floatability, stability and intensity, and avoid an energy concentration frequency band of waves, a fundamental frequency of the tower frame, 1P and 3P frequency ranges of the wind turbine and the vortex-induced vibration of the tension legs 5, and the optimal sizes of the upright columns 6 and the bottom pontoon 7 may be obtained by optimizing the hydrodynamic performance of the foundation using a hydrodynamic software or a model experiment.

The flare-type tension leg floating wind turbine foundation according to the first embodiment of the present application has a full-steel structure. For wind turbine generator sets 2 of different capacities, in construction, the flare-type tension leg floating wind turbine foundation may be assembled at a dock of a port close to the shore, and then the whole wind turbine foundation is wet-towed to the installation site and then positioned by mooring. The offshore wind turbine generator set 100 according to the embodiment of the present application has no routine maintenance requirement.

Hereinafter a flare-type tension leg floating wind turbine foundation 12 and an offshore wind turbine generator set 200 having the floating wind turbine foundation 12 according to a second embodiment of the present application are described in conjunction with FIG. 5 and FIG. 6.

Figure 5:
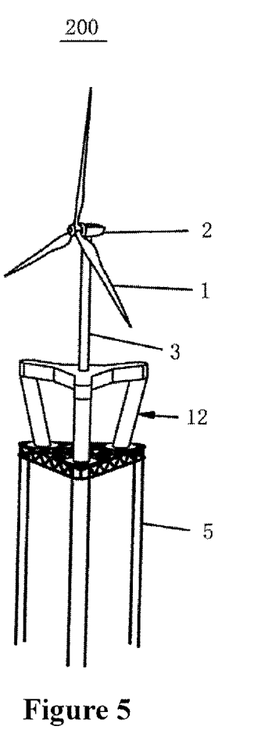
FIG. 5 is a perspective view showing an offshore wind turbine including a flare-type tension leg floating wind turbine foundation according to a second embodiment of the present application.

FIG. 5 is a perspective view showing the offshore wind turbine 200 having the flare-type tension leg floating wind turbine foundation 12 according to the second embodiment of the present application. FIG. 6 is a perspective view showing the offshore wind turbine 200 having the flare-type tension leg floating wind turbine foundation 12 according to the second embodiment of the present application, in which the wind turbine generator set 2 and the blades 1 are omitted.

Since the offshore wind turbine 200 is similar to the offshore wind turbine 100 having the flare-type tension leg floating foundation 4 according to the first embodiment of the present application, hence the same components are indicated by the same reference numbers and are not described in detail herein.

Figure 6:
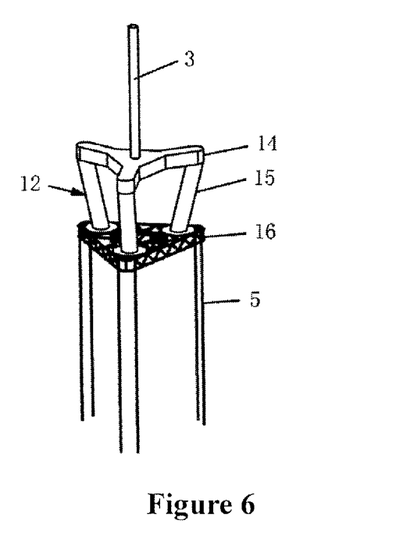
FIG. 6 is a perspective view showing the offshore wind turbine including the flare-type tension leg floating wind turbine foundation according to the second embodiment of the present application, in which a wind turbine generator set and blades are omitted.

As shown in FIG. 5 to FIG. 6, the flare-type tension leg floating foundation 12 according to the second embodiment of the present application includes a top support platform 14, three upright columns 15 and a bottom support structure 16.

The second embodiment mainly differs from the first embodiment in the structure of the top support platform 14, the shape of the upright columns 15 and the structure of the bottom support structure 16.

In the second embodiment, the top of the top support platform 14 is formed by a Y-shaped box-type structure, the bottom support structure 16 is formed by a truss structure, and a fairlead is provided at each outward protruding edge of the truss and is connected to two tension legs 5. Preferably, each of the upright columns 15 has a circular cross section. However, the present application is not limited to this, and the number and the shape of the upright columns 15, the shape of the top support platform 14 and the shape of the bottom support structure 16 may be changed. Similar to the first embodiment, the tension legs 5 may be connected to the fairleads on the bottom support structure 16 via universal joints. The bottom of the flare-type tension leg floating foundation 12 is connected by the truss structure, which saves the steel amount, and improves the economical efficiency of the foundation. The top support platform 14 has the box-type structure, which reduces the influence caused by a fatigue load in operation of the wind turbine, and the electrical cabinet and the ballast adjusting device may be arranged in the internal space of the top support platform 14, thereby improving space utilization.

Although it is not shown in the FIGS., a tower frame support base may be installed at the center of the top support platform 9 to support the bottom of the tower frame 3. The tower frame support base may employ the structure of the tower frame support base of the first embodiment or other structures. In addition, in this embodiment, the tower frame support base may be omitted, and in this case, the base of the tower frame 3 may be directly installed on the top support platform 14.

Although two embodiments are mainly described hereinabove, the present application is not limited to this. More embodiments can be obtained by combining the components in the two embodiments by those skilled in the art according to the teaching of the present application, and such embodiments are also deemed to be consistent with the concept of the present application.

A method for installing and constructing the offshore wind turbine according to the embodiments of the present application is described hereinafter, and the method mainly includes the following steps:

(1) assembling, at a dock of a port, the flare-type tension leg floating wind turbine foundation, the tower frame, the blades and the wind turbine generator set to form a whole floating offshore wind turbine;

(2) wet-towing, via a towboat, the whole floating offshore wind turbine to an offshore installation site; and (3) anchoring the tension legs to the sea bed.

During the process of assembling and fixing the whole floating offshore wind turbine, a ballast adjusting system may be used to maintain the whole floating offshore wind turbine in a stable state.

In addition, during the assembling process, the tension legs may be connected to the flare-type tension leg floating wind turbine foundation. The tension legs may also be connected after the whole floating offshore wind turbine is wet-towed to an offshore installation site by a towboat.

The following conclusions can be obtained based on the above description.

Firstly, the tension leg floating wind turbine foundation according to the present application employs the outward-inclined upright columns, thereby overcoming the stability problem in freely-towage of the general tension leg platform, realizing the wet-towage and installation of the whole floating wind turbine, and avoiding using an expensive large offshore transport vessel and installation vessel.

Secondly, the tension leg floating wind turbine foundation according to the present application employs outward protruding fairleads, thereby providing a greater restoring moment, reducing the movement range of the foundation, enabling the wind turbine to operate normally to generate electricity, and improving the generating capacity. In addition, compared with the conventional tension leg platform, the weight of the whole structure of the flare-type tension leg floating wind turbine foundation according to the present application is reduced by 30% by using the combination of the outward-inclined upright columns and the outward protruding fairleads.

Thirdly, in the present application, the tension legs may be made by the steel cable and polyester fiber cable with a high price performance ratio, thereby reducing the product cost of the offshore wind turbine and reducing the mooring cost and construction difficulty.

Fourthly, the flare-type tension leg floating wind turbine foundation according to the present application has a comprehensive indicator of the movement performance, the economy efficiency, and the installation, transportation and maintenance cost better than that of the jacket foundation at the sea area with a medium depth of water. For example, for a 6MW wind turbine, the steel amount for the tension leg foundation is reduced by 15% as compared with the jacket foundation.

Fifthly, the flare-type tension leg floating wind turbine foundation and the offshore wind turbine according to the present application can be manufactured conveniently, may be constructed on a general dock or a slipway and assembled integrally at the port of the shore. The wind turbine foundation and the wind turbine do not require the port to have a great depth of water, and may be wet-towed as a whole, and a large floating crane vessel in a conventional offshore lifting is omitted, thereby facilitating installing the offshore wind turbine and saving the transport and installation cost greatly.

Sixthly, for the floating wind turbine using the flare-type tension leg floating wind turbine foundation, in case of replacing a large-size component or a coming typhoon, the mooring rope may be untied, and the whole wind turbine can be towed back to the port by a common towboat to replace the component or shelter from the typhoon, the mobility and flexibility are good, thereby saving expensive costs for the large floating crane vessel and transport vessel, and avoiding the damage to the wind turbine set caused by the typhoon.

The present application is not limited to the above embodiments, and various variations and modifications can be made to the embodiments without departing from the scope of the present application.

The invention claimed is:

1. A flare-type tension leg floating wind turbine foundation, comprising:
   a top support platform configured to support a tower frame, a blade and a wind turbine generator set;
   a bottom support structure connected to a plurality of tension legs;
   at least three hollow upright columns connected between the top support platform and the bottom support structure and arranged around a vertical center line of the floating wind turbine foundation, each of the at least three upright columns being inclined outward from a lower end to an upper end with respect to the vertical center line of the floating wind turbine foundation; and
   a ballast adjusting system provided in the upright columns and/or the bottom support structure; and
   wherein the bottom support structure is formed by a polygonal pontoon, a plurality of outward protruding portions projecting from the polygonal pontoon, and bottoms of the upright columns are provided on the outward protruding portions respectively.

2. The flare-type tension leg floating wind turbine foundation according to claim 1, wherein a hole is formed in a central portion of the polygonal pontoon.

3. The flare-type tension leg floating wind turbine foundation according to claim 2, wherein the hole has a polygonal cross section.

4. The flare-type tension leg floating wind turbine foundation according to claim 1, wherein an included angle between each of the upright columns and a vertical direction ranges from 5 degrees to 15 degrees.

5. The flare-type tension leg floating wind turbine foundation according to claim 1, wherein the bottom support structure is formed by a truss structure.

6. The flare-type tension leg floating wind turbine foundation according to claim 5, wherein the truss structure has a polygonal planar shape, and fairleads are provided at outward protruding edges of the truss structure and are connected to the tension legs via universal joints.

7. The flare-type tension leg floating wind turbine foundation according to claim 1, wherein the ballast adjusting system is provided at the bottom of each of the upright columns.

8. The flare-type tension leg floating wind turbine foundation according to claim 1, wherein an outward protruding fairlead is formed at an end of each of the outward protruding portions of the polygonal pontoon, the tension legs are connected to the polygonal pontoon by the respective outward protruding fairlead, and the outward protruding fairlead is connected to the tension legs via a universal joint.

9. The flare-type tension leg floating wind turbine foundation according to claim 8, wherein the outward protruding fairlead is located at an outer side of each of the upright columns, at least two tension legs are connected to the outward protruding fairlead at the outer side of each of the upright columns, and an outward protruding horizontal length of the outward protruding fairlead is 0.5 to 1.5 times of a maximum outer diameter of the upright column.

10. The flare-type tension leg floating wind turbine foundation according to claim 1, wherein the top support platform is formed by a polygonal box-type structure, and an internal space for installing an auxiliary device is formed inside the top support platform.

11. The flare-type tension leg floating wind turbine foundation according to claim 10, wherein a tower frame support base is installed at a center of the top support platform to support the bottom of the tower frame.

12. The flare-type tension leg floating wind turbine foundation according to claim 1, wherein the top support platform is formed by a truss structure.

13. The flare-type tension leg floating wind turbine foundation according to claim 1, further comprising a tower frame support base provided on the top support platform.

14. The flare-type tension leg floating wind turbine foundation according to claim 13, wherein the tower frame support base comprises:
   a support tube installed on the top support platform; and
   a plurality of support rods arranged to surround the support tube, wherein each of the support rods has one end connected to an upper portion of the support tube and another end connected to the top support platform, to obliquely support the support tube.

15. The flare-type tension leg floating wind turbine foundation according to claim 14, wherein a space for installing an auxiliary device is formed inside the support tube.

16. The flare-type tension leg floating wind turbine foundation according to claim 1, wherein fairleads are formed at outer edges of the bottom support structure and are connected to the tension legs via universal joints.

17. A method for installing and constructing an offshore wind turbine, comprising the following steps:
   assembling, at a dock of a port, the flare-type tension leg floating wind turbine foundation according to claim 1, a tower frame, a blade and a wind turbine generator set, to form a whole floating offshore wind turbine;
   wet-towing the whole floating offshore wind turbine to an offshore installation site by a towboat; and
   anchoring the tension legs to the sea bed.

18. The method according to claim 17, comprising:
   during the process of assembling and fixing the whole floating offshore wind turbine, using the ballast adjusting system to maintain the whole floating offshore wind turbine in a stable state; and during the process of assembling, connecting the tension legs to the flare-type tension leg floating wind turbine foundation.

19. An offshore wind turbine, comprising a flare-type tension leg floating wind turbine foundation and a tower frame a blade and a wind turbine generator set installed on the floating wind turbine foundation; wherein the flare-type tension leg floating wind turbine foundation comprises:
- a top support platform configured to support the tower frame, the blade and the wind turbine generator set;
- a bottom support structure connected to a plurality of tension legs;
- at least three hollow upright columns connected between the top support platform and the bottom support structure and arranged around a vertical center line of the floating wind turbine foundation, each of the at least three upright columns being inclined outward from a lower end to an upper end with respect to the vertical center line of the floating wind turbine foundation; and
- a ballast adjusting system provided in the upright columns and/or the bottom support structure; and
- wherein the bottom support structure is formed by a polygonal pontoon, a plurality of outward protruding portions projecting from the polygonal pontoon, and bottoms of the upright columns are provided on the outward protruding portions respectively.

* * * * *